(12) United States Patent
Griess et al.

(10) Patent No.: US 10,766,598 B2
(45) Date of Patent: *Sep. 8, 2020

(54) WING-TO-FUSELAGE JOINTS AND AIRCRAFT INCLUDING THE SAME

(71) Applicant: The Boeing Company, Chicago, IL (US)

(72) Inventors: Kenneth H. Griess, Kent, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 413 days.

This patent is subject to a terminal disclaimer.

(21) Appl. No.: 15/623,256

(22) Filed: Jun. 14, 2017

(65) Prior Publication Data

US 2018/0362140 A1 Dec. 20, 2018

(51) Int. Cl.
*B64C 1/26* (2006.01)
*B64C 1/06* (2006.01)
*B64C 3/18* (2006.01)
*B64C 1/00* (2006.01)

(52) U.S. Cl.
CPC ............... *B64C 1/26* (2013.01); *B64C 1/068* (2013.01); *B64C 3/185* (2013.01); *B64C 2001/0072* (2013.01)

(58) Field of Classification Search
CPC ... B64C 1/26; B64C 1/068; B64C 2001/0072; B64C 3/26; B64C 3/185
See application file for complete search history.

(56) References Cited

U.S. PATENT DOCUMENTS

| 7,837,148 | B2 | 11/2010 | Kismarton et al. |
| 8,746,616 | B2 | 6/2014 | Barmichev et al. |
| 9,272,769 | B2 | 3/2016 | Lin et al. |
| 2008/0099610 | A1* | 5/2008 | Jimenez Del Lago ... B64C 1/26 244/119 |
| 2011/0210206 | A1 | 9/2011 | Werth et al. |
| 2012/0043422 | A1* | 2/2012 | Campana ................. B64C 1/26 244/123.1 |

(Continued)

FOREIGN PATENT DOCUMENTS

DE 102007019692 10/2008

OTHER PUBLICATIONS

Machine-generated English translation of the abstract of DE 102007019692, downloaded from Espace.net Feb. 13, 2020.

(Continued)

*Primary Examiner* — Rodney A Bonnette
(74) *Attorney, Agent, or Firm* — Dascenzo Intellectual Property Law, P.C.

(57) ABSTRACT

Wing-to-fuselage joints and aircraft including the same. An aircraft includes a fuselage with an outer fuselage skin that at least partially defines an outer surface of the fuselage and a wing assembly operably coupled to the fuselage via a wing-to-fuselage joint. The wing assembly includes a left wing region with a lower left-wing-region skin and an upper left-wing-region skin, a right wing region with a lower right-wing-region skin and an upper right-wing-region skin, and a center wing region with a lower center-wing-region skin. The outer fuselage skin is coextensive with the lower center-wing-region skin.

26 Claims, 6 Drawing Sheets

(56) References Cited

U.S. PATENT DOCUMENTS

| | | |
|---|---|---|
| 2014/0145031 A1 | 5/2014 | Moselage, III |
| 2014/0175218 A1* | 6/2014 | Gallant .................... B64C 1/00 |
| | | 244/118.1 |
| 2015/0246719 A1* | 9/2015 | Pelissier .................. B64C 1/12 |
| | | 244/120 |
| 2016/0185438 A1* | 6/2016 | Rouyre ................... B64C 1/064 |
| | | 244/119 |
| 2017/0066520 A1 | 3/2017 | Soula et al. |
| 2018/0086458 A1 | 3/2018 | Sartorius et al. |
| 2018/0362141 A1* | 12/2018 | Griess ...................... B64C 1/26 |

OTHER PUBLICATIONS

European Patent Office, Extended European Search Report for related European Application No. 18177544, dated Nov. 14, 2018.

* cited by examiner

WING-TO-FUSELAGE JOINTS AND AIRCRAFT INCLUDING THE SAME

FIELD

The present disclosure relates to wing-to-fuselage joints and aircraft including the same.

BACKGROUND

Traditional aircraft manufacturing methods and designs are limited by engineering constraints, such as limitations imposed by the widespread use of metals such as aluminum in the airframe structure. For example, the physical properties of aluminum generally require that complex structures be assembled from a plurality of distinct aluminum components that are bolted or otherwise coupled to one another. As a more specific example, the formability of components such as aluminum plates, sheets, and extrusions may require that a traditional wing-to-fuselage joint in a commercial aircraft be a complex structure formed from a plurality of distinct components coupled together. Such a complex design may require using rivets, fasteners, and fittings that concentrate and resolve loads within localized areas. By contrast, modern aircraft manufacturing may employ the use of composite materials that may be formed into continuous, unitary structures with complex contours and highly tailored structural properties. However, such composite materials may present engineering and manufacturing difficulties when incorporated into traditional airframe designs optimized for aluminum construction.

SUMMARY

Wing-to-fuselage joints and aircraft including the same are disclosed herein. An aircraft includes a fuselage with an outer fuselage skin that at least partially defines an outer surface of the fuselage and a wing assembly operably coupled to the fuselage via a wing-to-fuselage joint. The wing assembly includes a left wing region, a right wing region, and a center wing region between the left wing region and the right wing region. The left wing region includes a lower left-wing-region skin that at least partially defines a lower left-wing-region airfoil surface and an upper left-wing-region skin that at least partially defines an upper left-wing-region airfoil surface. The right wing region includes a lower right-wing-region skin that at least partially defines a lower right-wing-region airfoil surface and an upper right-wing-region skin that at least partially defines an upper right-wing-region airfoil surface. The center wing region includes a lower center-wing-region skin.

In some examples, the wing-to-fuselage joint includes a single skin segment that at least partially defines both the outer fuselage skin and the lower center-wing-region skin.

In some examples, the wing assembly includes a single skin segment that at least partially defines each of the upper center-wing-region skin and at least one of the upper left-wing-region skin and the upper right-wing-region skin.

In some examples, the aircraft further includes a wheel well within the fuselage rearward of the center wing region and comprising a wheel-well pressure deck constructed at least partially of an upper wheel-well skin, the center wing region further includes an upper center-wing-region skin, and a single skin segment at least partially defines both the upper wheel-well skin and the upper center-wing-region skin.

In some examples, the center wing region further includes an upper center-wing-region skin, the wing assembly further includes a forward-most center wing spar and an aft-most center wing spar within the center wing region, and a maximum vertical distance between the lower center-wing-region skin and the upper center-wing-region skin is at least 35% of a maximum longitudinal distance between the forward-most center wing spar and the aft-most center wing spar.

In some examples, the wing assembly further includes a single forward-most wing spar that spans the left wing region, the center wing region, and the right wing region.

In some examples, the wing assembly further includes a single left forward-most wing spar that spans the left wing region and a left half of the center wing region and a single right forward-most wing spar that spans the right wing region and a right half of the center wing region.

DESCRIPTION

Wing-to-fuselage joints and aircraft including the same are disclosed herein. Generally, in the figures, elements that are likely to be included in a given example are illustrated in solid lines, while elements that are optional to a given example are illustrated in dash-dot lines. However, elements that are illustrated in solid lines are not essential to all examples of the present disclosure, and an element shown in solid lines may be omitted from a particular example without departing from the scope of the present disclosure.

Figure 1:
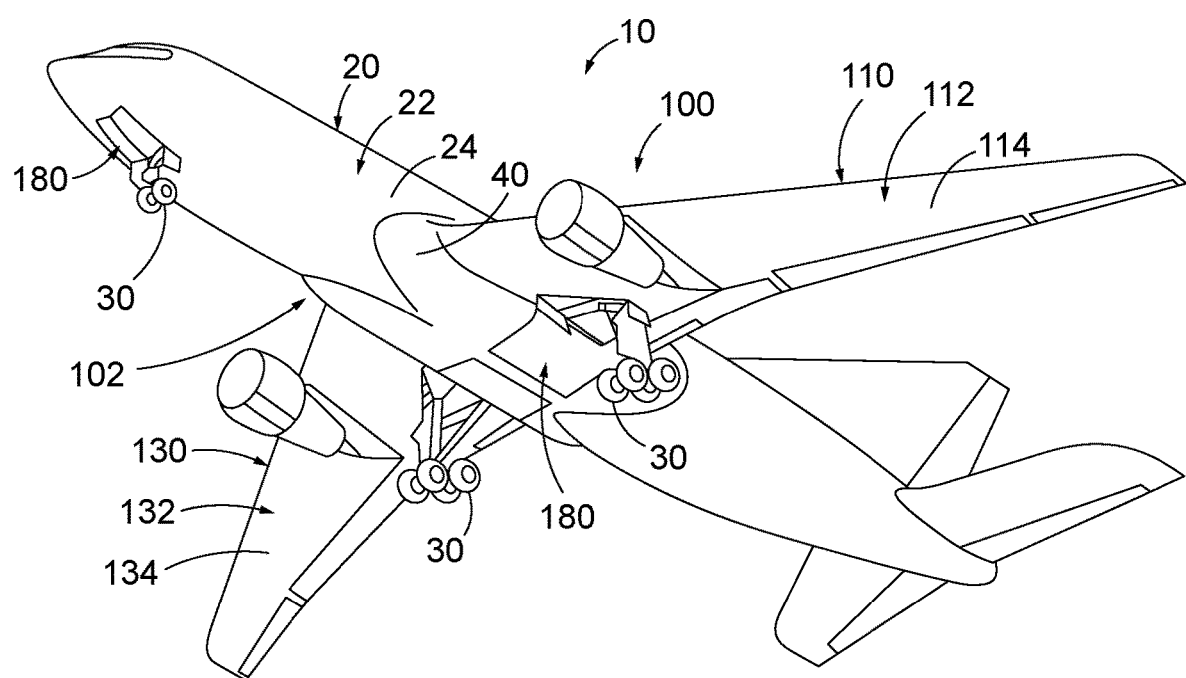
FIG. 1 is a perspective view of an example aircraft.

FIG. 1 is an illustration of an example aircraft 10 that includes a wing-to-fuselage joint 102 according to the present disclosure. Aircraft 10 generally may be utilized to transport persons and/or cargo, and may be a commercial aircraft or a military aircraft. As illustrated in FIG. 1, aircraft 10 generally includes a fuselage 20 and a wing assembly 100 operatively coupled to fuselage 20. In some aircraft 10, fuselage 20 may be generally cylindrical. Fuselage 20 and/or wing assembly 100 define one or more wheel wells 180 operatively coupled to and/or configured to receive a corresponding landing gear structure 30. Wing assembly 100 is coupled to fuselage 20 via wing-to-fuselage joint 102, which may be covered by a wing root fairing 40 to optimize aerodynamic properties of aircraft 10. Such a configuration may be contrasted with an aircraft design such as may be associated with fighter jet aircraft, in which a wing assembly and a fuselage are not well defined and/or distinct components of the aircraft.

While FIG. 1 illustrates aircraft 10 as a fixed-wing aircraft, this is not required, and it is additionally within the scope of the present disclosure that wing-to-fuselage joint 102 may be utilized with any aircraft 10 that includes a fixed airfoil surface coupled to fuselage 20. As examples, aircraft 10 may include and/or be a vertical take-off and landing (VTOL) aircraft, a gyrodyne, a gyroplane, and/or a tilt-rotor aircraft. In such examples, wing assembly 100 may refer to any appropriate lift surface and/or airfoil surface that is statically coupled to fuselage 20.

FIGS. 2-5 are schematic views of illustrative, non-exclusive examples of components and portions of wing-to-fuselage joints 102. Wing-to-fuselage joint 102 may be optimized for aircraft manufacturing methods and designs that employ composite materials that may be formed into complex contours and shapes. For example, wing-to-fuselage joint 102 generally may be configured such that an outer surface of wing assembly 100 is blended into and/or coextensive with an outer surface of fuselage 20, such as may be impractical to achieve using traditional metallic construction materials such as aluminum. Such a design may serve to distribute a stress and/or a bending load imparted on fuselage 20 by wing assembly 100 (or vice versa) across a larger surface area, thereby minimizing fatigue of the constituent materials and strengthening wing-to-fuselage joint 102.

Figure 2:
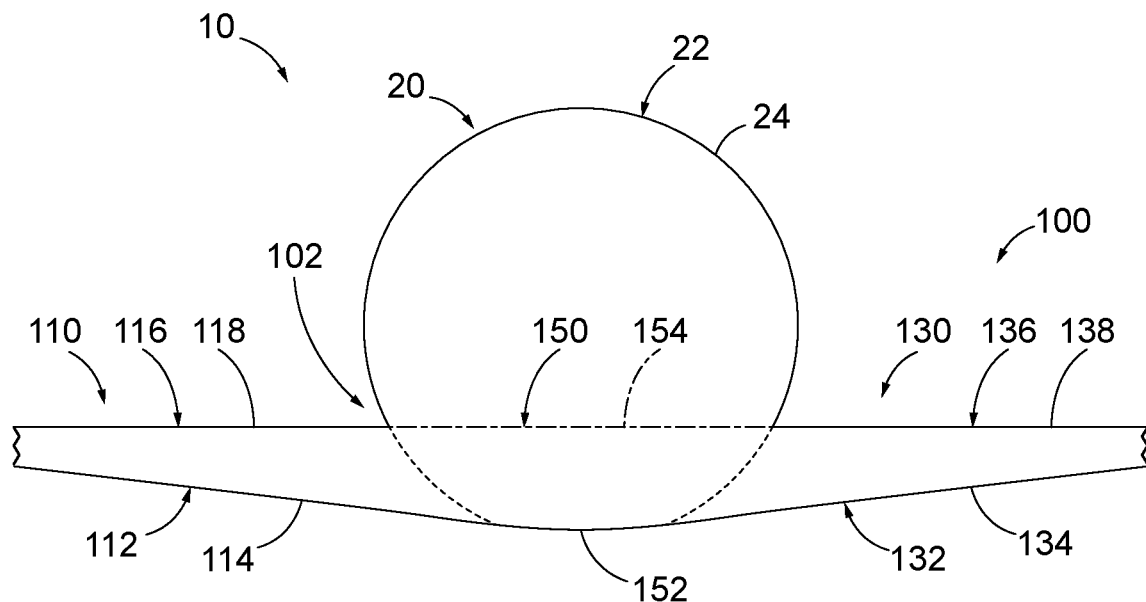
FIG. 2 is a schematic cross-sectional fragmentary rear elevation view depicting aircraft including wing-to-fuselage joints according to the present disclosure.

FIG. 2 is a schematic cross-sectional fragmentary rear view of aircraft 10. As schematically illustrated in FIG. 2, fuselage 20 of aircraft 10 includes an outer surface 22 and an outer fuselage skin 24 that at least partially defines outer surface 22, and wing assembly 100 is operably coupled to fuselage 20 at wing-to-fuselage joint 102. As used herein, wing-to-fuselage joint 102 is intended to refer to any appropriate portion(s), component(s), and/or an entirety of a coupling and/or interface between wing assembly 100 and fuselage 20. Wing assembly 100 includes a left wing region 110 that extends from a left-hand side of fuselage 20, a right wing region 130 that extends from a right-hand side of fuselage 20, and a center wing region 150 that extends between left wing region 110 and right wing region 130 within fuselage 20. As illustrated in dashed lines in FIG. 2, center wing region 150 may refer to a portion of wing assembly 100 that is generally enclosed by fuselage 20 and/or that is within a region that is positioned directly between a forward portion and a rearward portion of fuselage 20. However, this is not required, and it is within the scope of the present disclosure that center wing region 150 may include and/or be any appropriate portion of wing assembly 100 positioned between left wing region 110 and right wing region 130.

As used herein, positional terms such as "left," "left-hand," "right," "right-hand," "top," "upper," "bottom," "lower," "above," "below," "forward," "aft," "rearward," and the like are considered from the perspective of aircraft 10 positioned upright and in level flight such that fuselage 20 is generally parallel to a ground surface and such that aircraft 10 moves in a forward direction. As used herein, directional terms such as "longitudinal," "lateral," and the like are considered with respect to a long axis of fuselage 20. For example, a direction parallel to the long axis of fuselage 20 may be described as a longitudinal direction, whereas a direction perpendicular to the long axis of fuselage 20 may be described as a lateral direction. As used herein, the term "coextensive," as used to describe adjacent components and/or regions, is intended to refer to components and/or regions that are smoothly connected to each other without abrupt and/or sharp edges, corners, discontinuities, ledges, etc.

As schematically illustrated in FIG. 2, left wing region 110 includes a lower left-wing-region skin 114 that at least partially defines a lower left-wing-region airfoil surface 112 and an upper left-wing-region skin 118 that at least partially defines an upper left-wing-region airfoil surface 116. Similarly, right wing region 130 includes a lower right-wing-region skin 134 that at least partially defines a lower right-wing-region airfoil surface 132 and an upper right-wing-region skin 138 that at least partially defines an upper right-wing-region airfoil surface 136. Center wing region 150 includes a lower center-wing-region skin 152 and also may include an upper center-wing-region skin 154.

As discussed, wing-to-fuselage joints 102 according to the present disclosure may be particularly well suited for aircraft manufacturing techniques and designs that employ composite construction materials. For example, outer fuselage skin 24, lower left-wing-region skin 114, upper left-wing-region skin 118, lower right-wing-region skin 134, upper right-wing-region skin 138, lower center-wing-region skin 152, and/or upper center-wing-region skin 154 may be constructed of a composite material, such as a fiber reinforced composite material.

Figure 3:
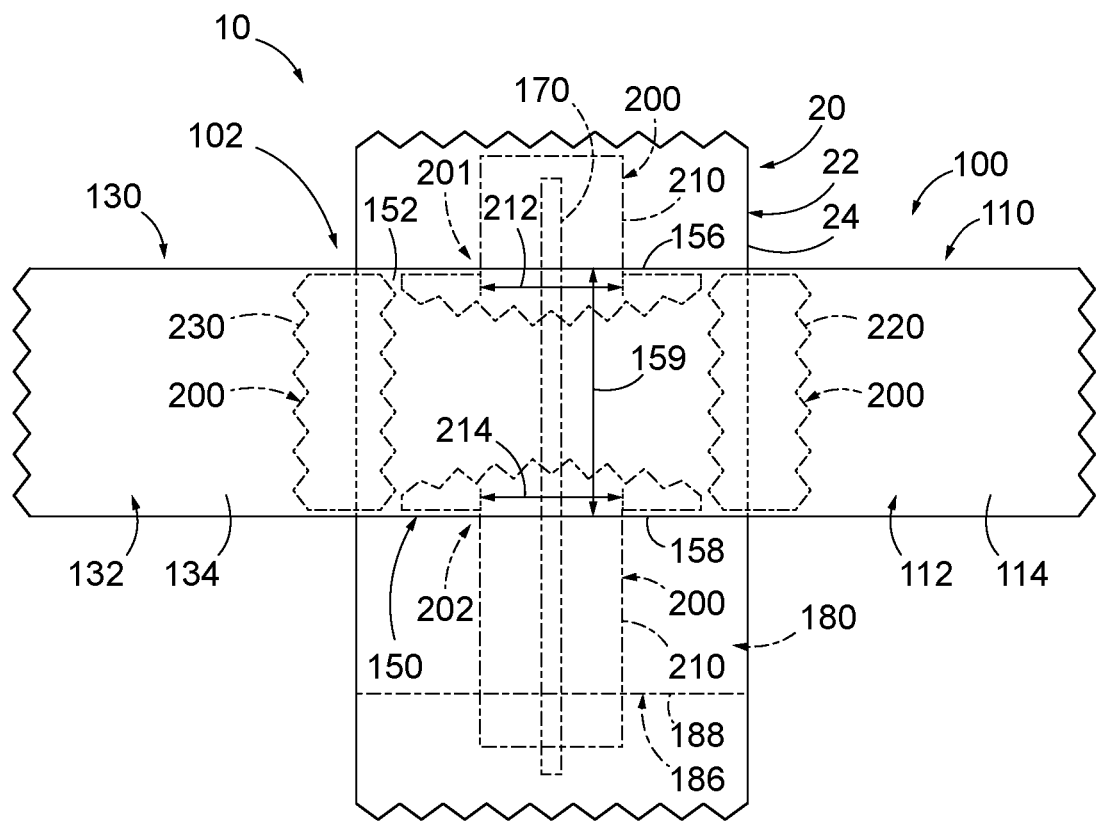
FIG. 3 is a schematic fragmentary bottom plan view depicting aircraft including wing-to-fuselage joints according to the present disclosure.
Figure 4:
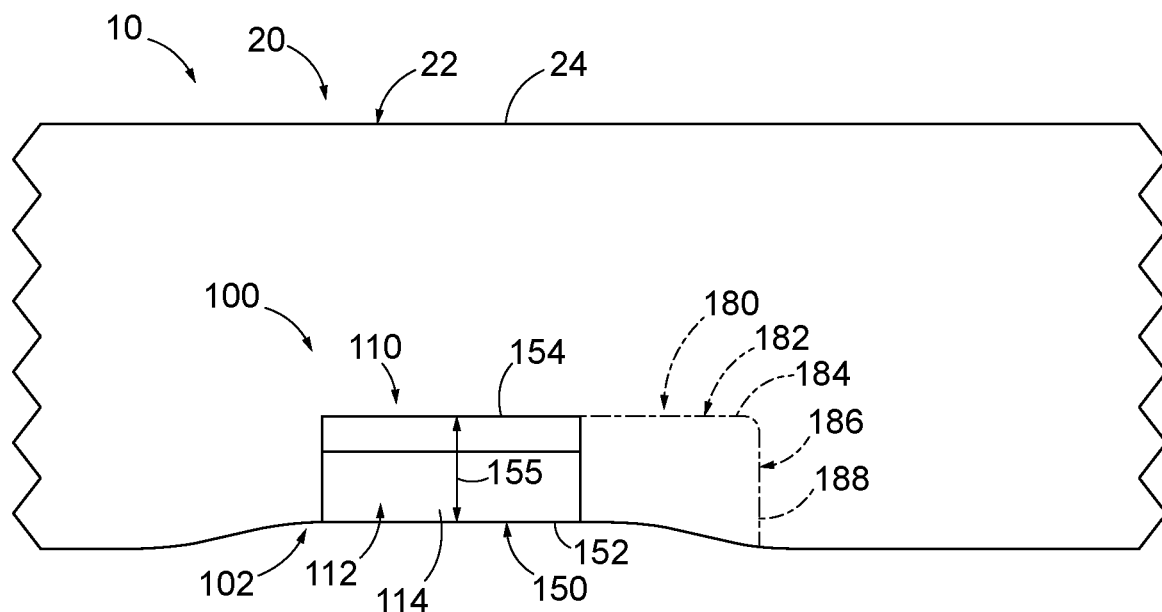
FIG. 4 is a schematic fragmentary side elevation view depicting aircraft including wing-to-fuselage joints according to the present disclosure.

FIG. 3 is a schematic fragmentary bottom view of wing-to-fuselage joint 102, and FIG. 4 is a schematic fragmentary side view of wing-to-fuselage joint 102. As schematically illustrated in FIG. 3, wing assembly 100 may include a forward-most center wing spar 156 positioned at or near a forward-most edge of center wing region 150 and an aft-most center wing spar 158 positioned at or near a rear-most edge of center wing region 150. As further schematically illustrated in FIG. 3, aircraft 10 may include wheel well 180 defined within fuselage 20 aft of center wing region 150. As schematically illustrated in FIGS. 3-4, wheel well 180 may include a wheel-well pressure deck 182 (illustrated in FIG. 4) that defines a top surface of wheel well 180 and a rear wheel-well bulkhead 186 that defines an aft surface of wheel well 180. Rear wheel-well bulkhead 186 may be described as extending downward from a rearward edge of wheel-well pressure deck 182. Wheel-well pressure deck 182 may be at least partially defined by an upper wheel-well skin 184 (illustrated in FIG. 4), and rear wheel-well bulkhead 186 may be at least partially defined by a wheel-well-bulkhead skin 188. It is additionally within the scope of the present disclosure that wheel well 180 be positioned forward of center wing region 150.

As further schematically illustrated in FIG. 4, center wing region 150 may be characterized by a maximum vertical distance 155 between lower center-wing-region skin 152 and upper center-wing-region skin 154. As examples, maximum vertical distance 155 may be at least 25%, at least 30%, at least 35%, and/or at least 40% of a maximum longitudinal distance 159 (illustrated in FIG. 3) between forward-most center wing spar 156 and aft-most center wing spar 158. Such a configuration may yield a center wing region 150 that is deeper than that of a traditional aircraft design, which may increase a total fuel capacity of aircraft 10 and/or may more effectively distribute a bending load and/or stress through center wing region 150. As further schematically illustrated in FIG. 3, aircraft 10 may include a keel beam 170 extending from at least partially within center wing region 150 rearward across wheel well 180, and optionally further extending forward of center wing region 150. Keel beam 170 may be configured to enhance a longitudinal rigidity of fuselage 20.

As schematically illustrated in FIG. 3, and as described herein, wing-to-fuselage joint 102 may include at least one single skin segment 200 that spans two or more of fuselage 20, left wing region 110, right wing region 130, center wing region 150, and wheel well 180. As used herein, the term "single skin segment" is intended to refer to a skin (i.e., sheet-like) component that during the manufacturing process takes the form of a unitary component, a continuous component, and/or a component that is not held together by mechanical fasteners. Hence, all regions of a surface of a single skin segment 200 may be described as being coextensive with one another. For example, when wing-to-fuselage joints 102 employ composite construction materials, a single skin segment 200 may consist of a single lay-up of multiple plies of composite material. However, upon final assembly and curing of a wing-to-fuselage joint 102, the discrete nature of the single skin segment 200 may no longer be apparent, in so far as adjacent skin segments may effectively become coextensive with the single skin segment.

As schematically illustrated in FIG. 3, wing-to-fuselage joint 102 may include a single skin segment 210 that at least partially defines each of outer fuselage skin 24 and lower center-wing-region skin 152. Single skin segment 210 may be described as blending center wing region 150 into fuselage 20 in a longitudinal direction, such as to reduce a localized stress at an interface between center wing region 150 and fuselage 20. Additionally or alternatively, single skin segment 210 may at least partially define each of lower center-wing-region skin 152 and keel beam 170. As examples, single skin segment 210 may be coextensive with an exterior surface of keel beam 170, may form a portion of keel beam 170, and/or may be integrally formed with at least a portion of keel beam 170.

As illustrated in FIG. 3, single skin segment 210 may be described as having a first lateral width 212 at a first transition 201 between center wing region 150 and fuselage 20 forward of center wing region 150 and/or as having a second lateral width 214 at a second transition 202 between center wing region 150 and fuselage 20 rearward of center wing region 150. First lateral width 212 and/or second lateral width 214 may be any appropriate widths for distributing a bending load and/or stress across first transition 201 and/or second transition 202. As examples, each of first lateral width 212 and second lateral width 214 may be at least 20%, at least 25%, at least 30%, and/or at least 35% of maximum longitudinal distance 159 between forward-most center wing spar 156 and aft-most center wing spar 158.

Additionally or alternatively, single skin segment 210 may be described as extending from center wing region 150 by a distance sufficient to reduce a bending load and/or stress at an interface between center wing region 150 and fuselage 20. For example, single skin segment 210 may extend forward of center wing region 150 by a distance that is at least 25%, at least 50%, and/or at least 75% of maximum longitudinal distance 159 between forward-most center wing spar 156 and aft-most center wing spar 158. Similarly, single skin segment 210 may extend rearward of center wing region 150 by a distance that is at least 25%, at least 50%, and/or at least 75% of maximum longitudinal distance 159 between forward-most center wing spar 156 and aft-most center wing spar 158.

Wing-to-fuselage joint 102 and/or a single skin segment 200 also may be described as forming a smooth transition between wing assembly 100 and fuselage 20. Stated differently, wing-to-fuselage joint 102 and/or a single skin segment 200 (such as single skin segment 210) may be configured to blend an outer surface of wing assembly 100 into outer surface 22 of fuselage 20 without forming sharp corners, edges, and/or other regions susceptible to a concentration of a bending load and/or stress. As an example, wing-to-fuselage joint 102 may be configured such that, at any longitudinal cross-section at first transition 201 and/or at second transition 202, a change in a radius of curvature between outer fuselage skin 24 and lower center-wing-region skin 152 is less than 5%, less than 2%, and/or zero.

Wing-to-fuselage joint 102 and/or single skin segment 210 additionally or alternatively may be described as being configured such that lower center-wing-region skin 152 is at least partially coextensive with outer fuselage skin 24. For example, first lateral width 212 at first transition 201 between center wing region 150 and fuselage 20 forward of center wing region 150 may correspond to an extent to which lower center-wing-region skin 152 is coextensive with outer fuselage skin 24 forward of center wing region 150. As more specific examples, lower center-wing-region skin 152 may be coextensive with outer fuselage skin 24 forward of center wing region 150 across a distance that is at least 20%, at least 25%, at least 30%, and/or at least 35% of maximum longitudinal distance 159 between forward-most center wing spar 156 and aft-most center wing spar 158.

Similarly, wing-to-fuselage joint 102 and/or single skin segment 210 may be described as being configured such that lower center-wing-region skin 152 is at least partially coextensive with outer fuselage skin 24 rearward of center wing region 150. For example, second lateral width 214 at second transition 202 between center wing region 150 and fuselage 20 rearward of center wing region 150 may correspond to an extent to which lower center-wing-region skin 152 is coextensive with outer fuselage skin 24 rearward of center wing region 150. As more specific examples, lower center-wing-region skin 152 may be coextensive with outer fuselage skin 24 rearward of center wing region 150 across a distance that is at least 20%, at least 25%, at least 30%, and/or at least 35% of maximum longitudinal distance 159 between forward-most center wing spar 156 and aft-most center wing spar 158.

As further schematically illustrated in FIG. 3, wing-to-fuselage joint 102 may include a single skin segment 220 that at least partially defines each of lower left-wing-region skin 114 and lower center-wing-region skin 152 and/or a single skin segment 230 that at least partially defines each of lower right-wing-region skin 134 and lower center-wing-region skin 152. Single skin segment 220 and/or single skin segment 230 may be described as being configured such that lower left-wing-region skin 114 and/or lower right-wing-region skin 134 are coextensive with lower center-wing-region skin 152. Additionally or alternatively, single skin segment 220 and/or single skin segment 230 may be described as being configured such that wing-to-fuselage joint 102 forms a smooth transition between wing assembly 100 and fuselage 20. As an example, single skin segment 220 and/or single skin segment 230 may be configured such that, at any lateral cross-section along a left transition between lower left-wing-region skin 114 and lower centerwing-region skin 152 and at any lateral cross-section along a right transition between lower right-wing-region skin 134 and lower center-wing-region skin 152, a change in the radius of curvature is less than 5%, less than 2%, and/or zero.

Single skin segment 210, single skin segment 220, and single skin segment 230 may refer to distinct single skin segments 200 and/or may be spaced apart following assembly of wing-to-fuselage joint 102. Additionally or alternatively, two or more of single skin segment 210, single skin segment 220, and single skin segment 230 may refer to and/or be the same single skin segment 200. As an example, in an example of wing-to-fuselage joint 102 that includes single skin segment 210, single skin segment 220, and single skin segment 230, wing-to-fuselage joint 102 equivalently may be described as including a single skin segment 200 that at least partially defines each of outer fuselage skin 24, lower center-wing-region skin 152, lower left-wing-region skin 114, and lower right-wing-region skin 134.

Figure 5:
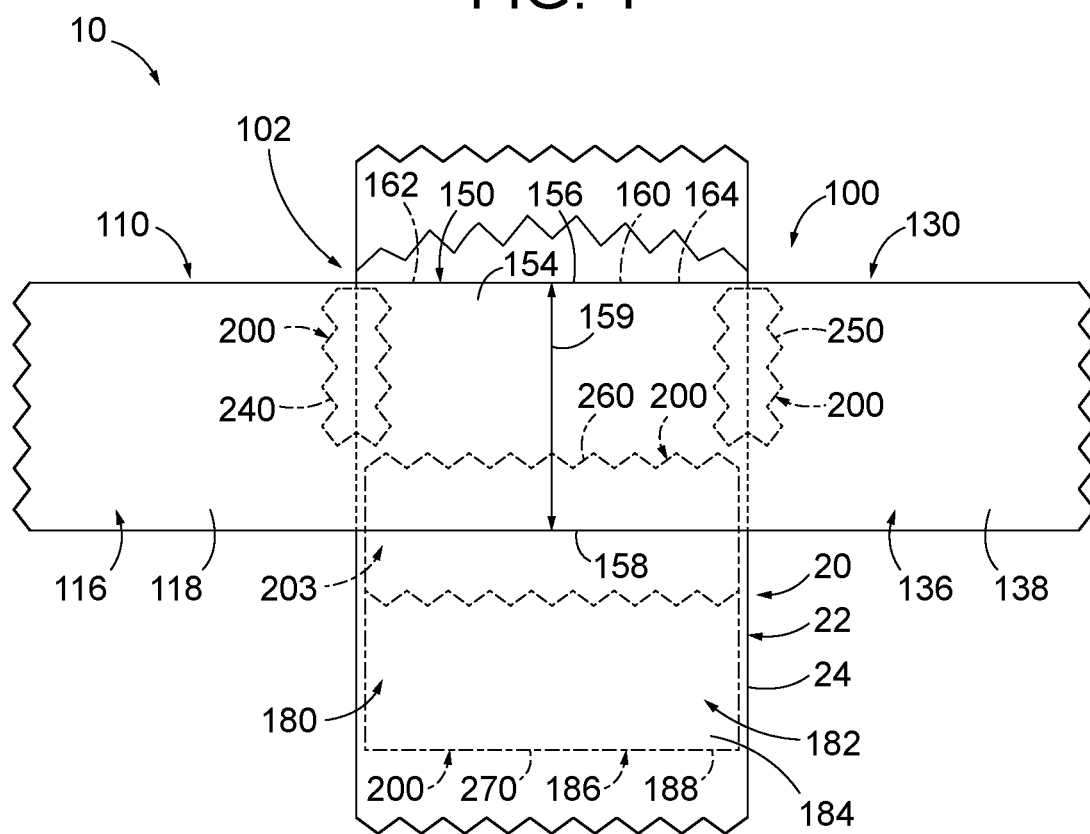
FIG. 5 is a schematic fragmentary cutaway top plan view depicting aircraft including wing-to-fuselage joints according to the present disclosure.

FIG. 5 is a schematic fragmentary top view of wing-to-fuselage joint 102. FIG. 5 further schematically illustrates wheel well 180 positioned rearward of center wing region 150. As schematically illustrated in FIG. 5, wing-to-fuselage joint 102 may include a single skin segment 240 that at least partially defines each of upper left-wing-region skin 118 and upper center-wing-region skin 154 and/or a single skin segment 250 that at least partially defines each of upper right-wing-region skin 138 and upper center-wing-region skin 154. Single skin segment 240 and/or single skin segment 250 may be configured such that upper left-wing-region skin 118, upper right-wing-region skin 138, and upper center-wing-region skin 154 are coextensive with each other. In such an example, single skin segment 240 and single skin segment 250 may be the same single skin segment 200.

As further schematically illustrated in FIG. 5, wing-to-fuselage joint 102 also may include a single skin segment 260 that at least partially defines each of upper wheel-well skin 184 and upper center-wing-region skin 154. In such an example, upper wheel-well skin 184 may be described as being coextensive with upper center-wing-region skin 154. Additionally or alternatively, wing-to-fuselage joint 102 may be characterized by a third transition 203 between upper wheel-well skin 184 and upper center-wing-region skin 154. As an example, third transition 203 may be planar, at least substantially planar, concave downward, and/or otherwise lack a region that is concave upward and/or that forms a local minimum of height within third transition 203. Such a design may restrict fluids and/or foreign objects from collecting at a lowest point or region at a transition region between upper wheel-well skin 184 and upper center-wing-region skin 154. As another example, wing-to-fuselage joint 102 may be configured such that, at any longitudinal cross-section along third transition 203 between upper wheel-well skin 184 and upper center-wing-region skin 154, a change in radius of curvature is less than 5%, less than 2%, and/or zero.

As further schematically illustrated in FIG. 5, wing-to-fuselage joint 102 further may include a single skin segment 270 that at least partially defines each of upper center-wing-region skin 154, upper wheel-well skin 184, and wheel-well-bulkhead skin 188. In such an example, single skin segment 270 may be considered to be the same as and/or an extension of single skin segment 260, and/or upper center-wing-region skin 154 may be described as being coextensive with upper wheel-well skin 184 and/or wheel-well-bulkhead skin 188. Single skin segment 270 additionally or alternatively may be described as partially defining and/or extending across each of upper wheel-well skin 184 and wheel-well-bulkhead skin 188, such that single skin segment 270 forms a smooth transition between wheel-well pressure deck 182 and rear wheel-well bulkhead 186.

Single skin segment 240, single skin segment 250, single skin segment 260, and single skin segment 270 may refer to distinct single skin segments 200 and/or may be spaced apart following assembly of wing-to-fuselage joint 102. Additionally or alternatively, two or more of single skin segment 240, single skin segment 250, single skin segment 260, and single skin segment 270 may refer to and/or be the same single skin segment 200. As an example, in an example of wing-to-fuselage joint 102 that includes single skin segment 240 and single skin segment 250, wing-to-fuselage joint 102 equivalently may be descried as including a single skin segment 200 that at least partially defines each of upper left-wing-region skin 118, upper center-wing-region skin 154, and upper right-wing-region skin 138.

With continued reference to FIG. 5, forward-most center wing spar 156 may be a single unitary component, or may refer to each of a plurality of distinct components. As an example, and as schematically illustrated in FIG. 5, wing assembly 100 may include a single forward-most wing spar 160 that spans left wing region 110, center wing region 150, and right wing region 130. More specifically, single forward-most wing spar 160 may be a continuous structure, may be a unitary structure, and/or may lack mechanical fasteners to form a full length of the single forward-most wing spar 160. Stated differently, in such an example, the portions of single forward-most wing spar 160 respectively located within left wing region 110, center wing region 150, and right wing region 130 may be described as being coextensive, or at least partially coextensive, with one another. In such an example, forward-most center wing spar 156 may correspond to a portion of single forward-most wing spar 160 that is positioned within center wing region 150. Such a configuration may serve to more effectively distribute a bending load and/or stress at wing-to-fuselage joint 102 relative to a traditional wing assembly configuration in which a left wing box and a right wing box each includes a distinct forward-most wing spar section that are coupled to a central wing box by mechanical fasteners.

As another example, and as schematically illustrated in FIG. 5, wing assembly 100 may include a single left forward-most wing spar 162 that spans left wing region 110 and a left half of center wing region 150 and a single right forward-most wing spar 164 that spans right wing region 130 and a right half of center wing region 150. In such an example, the portions of single left forward-most wing spar 162 respectively located within left wing region 110 and center wing region 150 may be described as being coextensive, or at least partially coextensive, with each other. Similarly, the portions of single right forward-most wing spar 164 respectively located within center wing region 150 and right wing region 130 may be described as being coextensive, or at least partially coextensive, with each other. In such an example, forward-most center wing spar 156 may refer to the portions of single left forward-most wing spar 162 and single right forward-most wing spar 164 that are positioned within center wing region 150. Such configurations may serve to more effectively distribute a bending load and/or stress at wing-to-fuselage joint 102 relative to a traditional wing assembly configuration in which a left wing box and a right wing box each includes a distinct forward-most wing spar section that is coupled to a central wing box by mechanical fasteners. Such configurations also may offer manufacturing benefits over examples of aircraft 10 that include a single forward-most wing spar 160. For example, manufacturing an aircraft 10 that includes a single forward-most wing spar 160 may necessitate utilizing a manufacturing apparatus such as an autoclave configured to enclose an entirety of the single forward-most wing spar 160, whereas manufacturing an aircraft 10 that includes a single left forward-most wing spar 162 and a single right forward-most wing spar 164 may be accomplished by utilizing a significantly smaller manufacturing apparatus.

Figure 6:
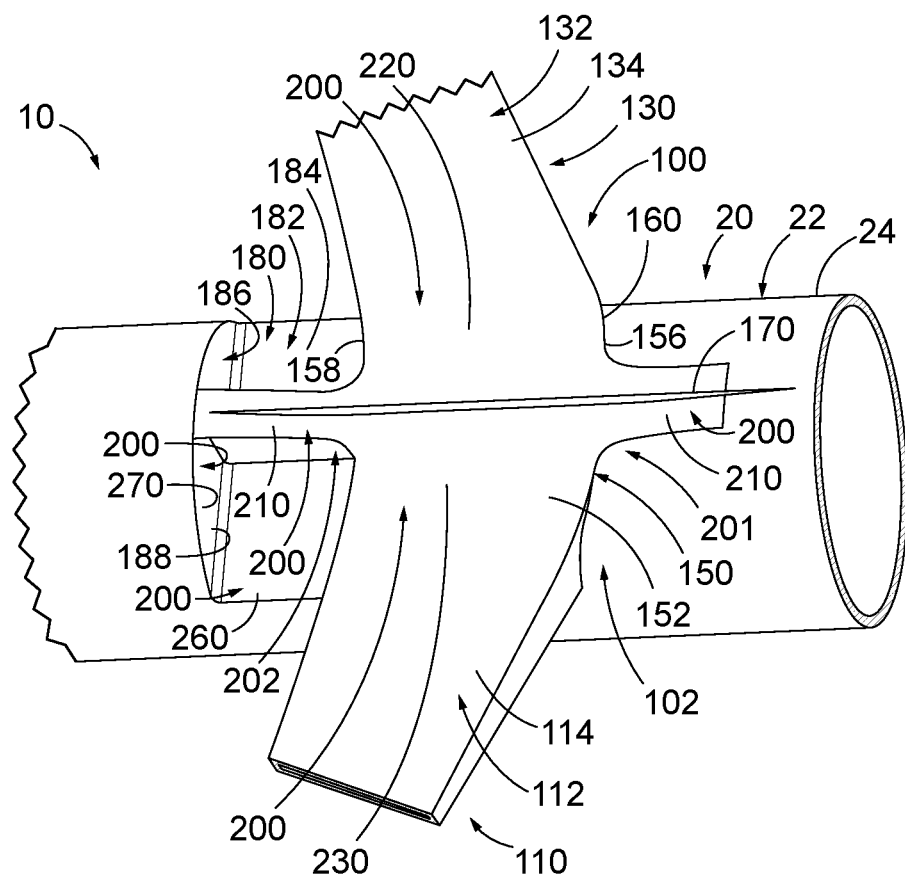
FIG. 6 is a fragmentary cutaway bottom perspective view depicting an aircraft including wing-to-fuselage joints according to the present disclosure and that includes a single forward-most wing spar.
Figure 7:
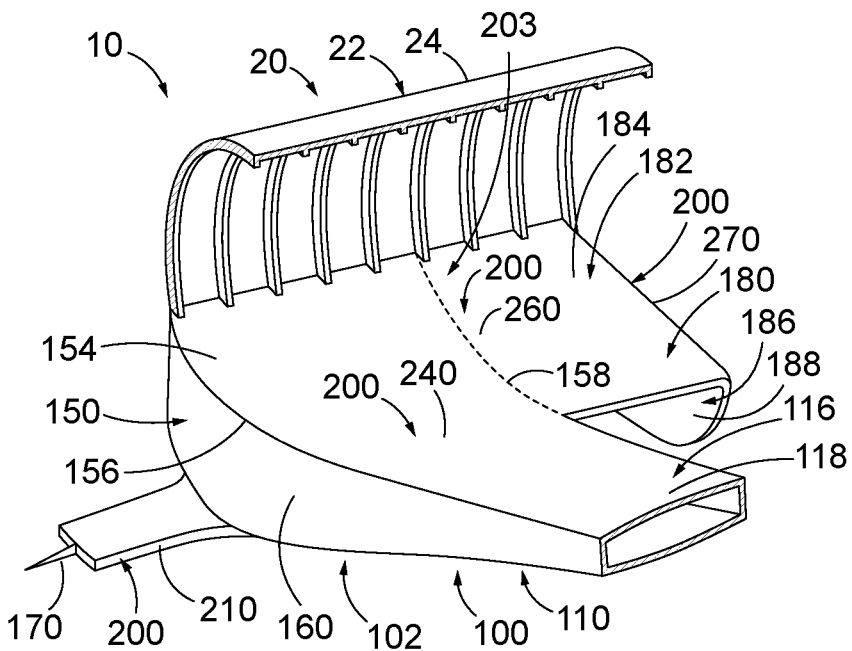
FIG. 7 is a fragmentary cutaway top perspective view of the aircraft of FIG. 6.
Figure 8:
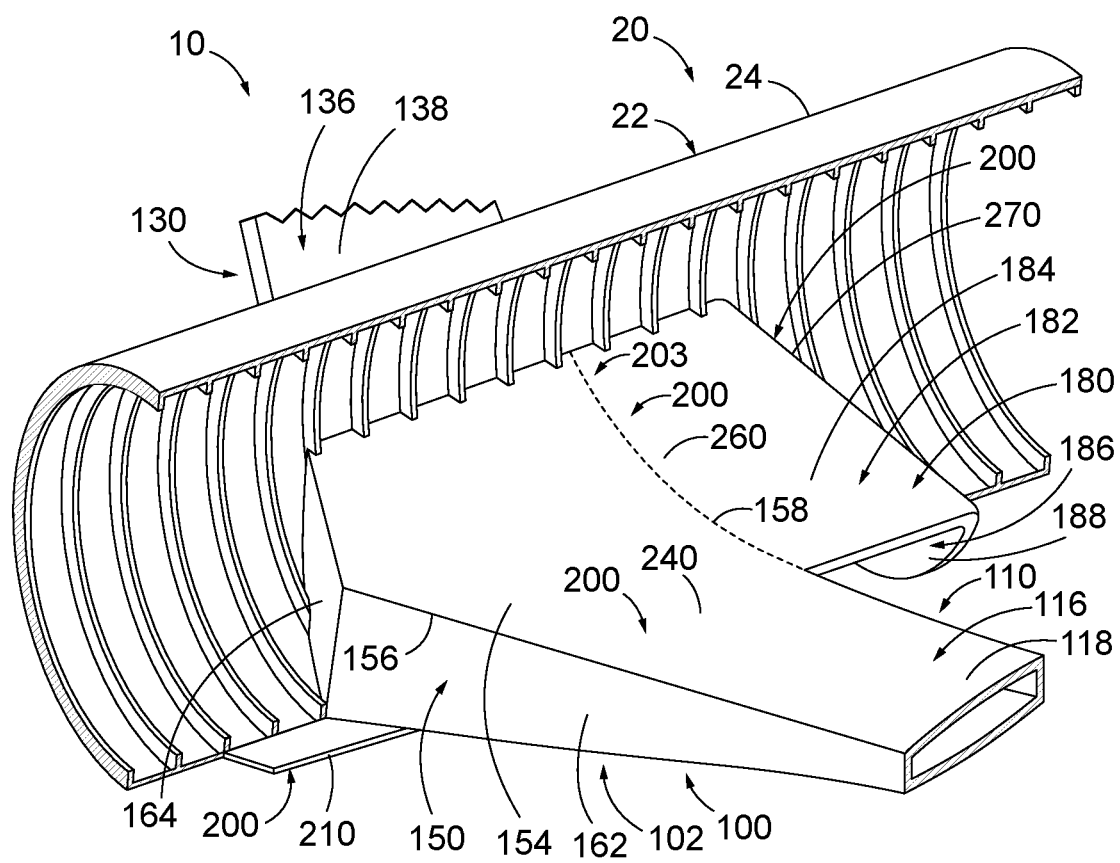
FIG. 8 is a fragmentary cutaway top perspective view depicting an aircraft including wing-to-fuselage joints according to the present disclosure and that includes a single left forward-most wing spar and a single right forward-most wing spar.

Turning now to FIGS. 6-8, illustrative non-exclusive examples of aircraft 10 including wing-to-fuselage joints 102 are illustrated. Where appropriate, the reference numerals from the schematic illustrations of FIGS. 2-5 are used to designate corresponding parts of FIGS. 6-8; however, the examples of FIGS. 6-8 are non-exclusive and do not limit aircraft 10 and/or wing-to-fuselage joints 102 to the illustrated examples of FIGS. 6-8. That is, aircraft 10 and/or wing-to-fuselage joints 102 are not limited to the specific examples of FIGS. 6-8, and aircraft 10 may incorporate any number of the various aspects, configurations, characteristics, properties, etc. of wing-to-fuselage joints 102 that are illustrated in and discussed with reference to the schematic representations of FIGS. 2-5 and/or the examples of FIGS. 6-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 6-8; however, it is within the scope of the present disclosure that the previously discussed features, variants, etc. may be utilized with the examples of FIGS. 6-8.

FIGS. 6-7 illustrate an example of aircraft 10 that includes single forward-most wing spar 160 that spans left wing region 110, right wing region 130 (illustrated in FIG. 6), and center wing region 150. In the example of FIGS. 6-7, and as illustrated in FIG. 6, wing-to-fuselage joint 102 includes a single skin segment 200 such that lower center-wing-region skin 152 is coextensive with outer fuselage skin 24 forward of center wing region 150 and rearward of center wing region 150, with lower left-wing-region skin 114, and with lower right-wing-region skin 134. As best illustrated in FIG. 7, the example additionally includes a single skin segment 200 such that upper center-wing-region skin 154 is coextensive with upper left-wing-region skin 118, with upper right-wing-region skin 138 (not visible in FIG. 7), with upper wheel-well skin 184, and with wheel-well-bulkhead skin 188. More specifically, upper center-wing-region skin 154 is coextensive with upper wheel-well skin 184 such that third transition 203 is substantially planar, and upper wheel-well skin 184 is coextensive with wheel-well-bulkhead skin 188 such that a transition between wheel-well pressure deck 182 and rear wheel-well bulkhead 186 is smoothly curved.

FIG. 8 illustrates an example of aircraft 10 that includes single left forward-most wing spar 162 that spans left wing region 110 and the left half of center wing region 150 and single right forward-most wing spar 164 that spans right wing region 130 and the right half of center wing region 150. Similar to the example of FIGS. 6-7, and as illustrated in FIG. 8, the example of FIG. 8 includes wing-to-fuselage joint 102 with a single skin segment 200 such that upper center-wing-region skin 154 is coextensive with upper left-wing-region skin 118, with upper right-wing-region skin 138, with upper wheel-well skin 184, and with wheel-well-bulkhead skin 188. More specifically, upper center-wing-region skin 154 is coextensive with upper wheel-well skin 184 such that third transition 203 is substantially planar, and upper wheel-well skin 184 is coextensive with wheel-well-bulkhead skin 188 such that a transition between wheel-well pressure deck 182 and rear wheel-well bulkhead 186 is smoothly curved. As further illustrated in FIG. 8, the example aircraft 10 includes keel beam 170 that extends across wheel well 180 through center wing region 150 and forward of center wing region 150.

Figure 9:
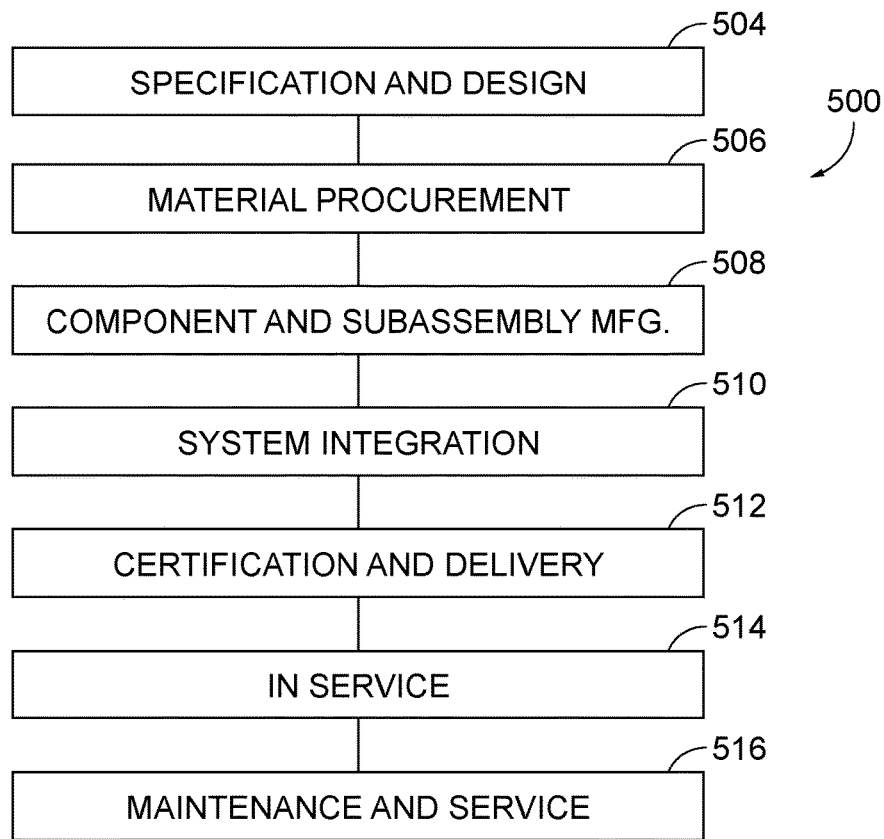
FIG. 9 is a flowchart schematically representing aircraft production and service methodology.
Figure 10:
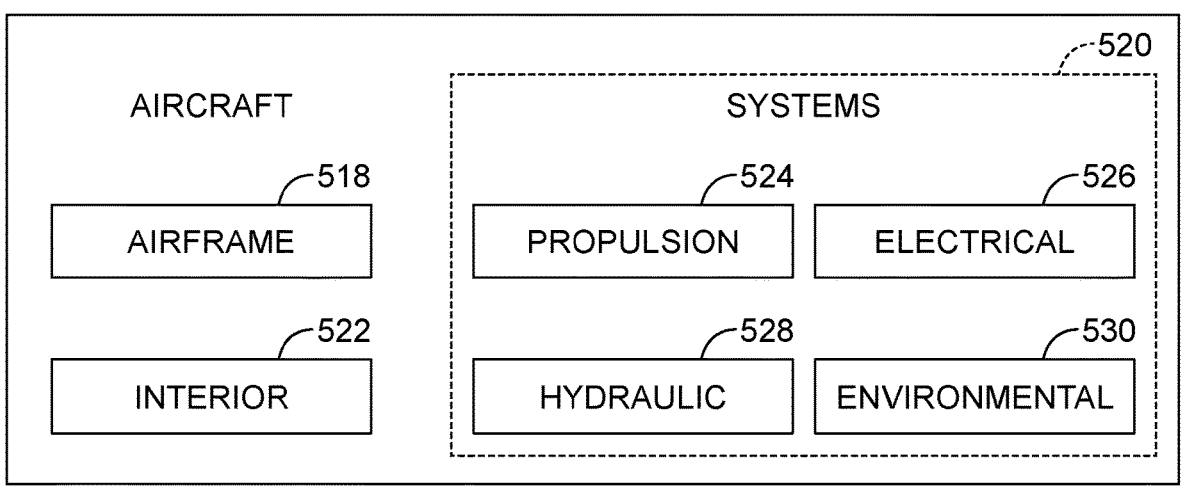
FIG. 10 is a block diagram schematically representing an aircraft.

Turning now to FIGS. 9-10, examples of the present disclosure may be described in the context of an aircraft manufacturing and service method 500 as shown in FIG. 9 and an aircraft 10 as shown in FIG. 10. During pre-production, exemplary method 500 may include specification and design 504 of the aircraft 10 and material procurement 506. During production, component and subassembly manufacturing 508 and system integration 510 of the aircraft 10 takes place. Thereafter, the aircraft 10 may go through certification and delivery 512 in order to be placed in service 514. While in service, the aircraft 10 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 10 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems also may be included. Although an aerospace example is shown, the principles of the subject matter disclosed herein may be applied to other industries, such as the automotive industry.

Apparatus and methods disclosed herein may be employed during any one or more of the stages of the production and service method 500. For example, components or subassemblies corresponding to production process 508 may be fabricated or manufactured in a manner similar to components or subassemblies produced while the aircraft 10 is in service. Also, one or more apparatus examples, method examples, or a combination thereof may be utilized during the production stages 508 and 510, for example, by substantially expediting assembly of or reducing the cost of an aircraft 10. Similarly, one or more of apparatus examples, method examples, or a combination thereof may be utilized while the aircraft 10 is in service, for example and without limitation, to maintenance and service 516.

Illustrative, non-exclusive examples of inventive subject matter according to the present disclosure are described in the following enumerated paragraphs:

A. An aircraft, comprising:
   a fuselage, wherein the fuselage comprises an outer fuselage skin that at least partially defines an outer surface of the fuselage; and
   a wing assembly operably coupled to the fuselage via a wing-to-fuselage joint, wherein the wing assembly comprises:
      a left wing region comprising a lower left-wing-region skin that at least partially defines a lower left-wingregion airfoil surface and an upper left-wing-region skin that at least partially defines an upper left-wing-region airfoil surface;

a right wing region comprising a lower right-wing-region skin that at least partially defines a lower right-wing-region airfoil surface and an upper right-wing-region skin that at least partially defines an upper right-wing-region airfoil surface; and a center wing region between the left wing region and the right wing region and comprising a lower center-wing-region skin.

A1. The aircraft of paragraph A, wherein the wing-to-fuselage joint includes a (first) single skin segment that at least partially defines both the outer fuselage skin and the lower center-wing-region skin.

A1.1. The aircraft of paragraph A1, wherein the wing assembly further comprises a forward-most center wing spar and an aft-most center wing spar within the center wing region; and wherein the (first) single skin segment has a (first) lateral width at a (first) transition between the center wing region and the fuselage forward of the center wing region that is at least 20%, at least 25%, at least 30%, and/or at least 35% of a maximum longitudinal distance between the forward-most center wing spar and the aft-most center wing spar.

A1.1.1. The aircraft of paragraph A1.1, wherein at any longitudinal cross-section at the (first) transition, a change in radius of curvature between the outer fuselage skin and the lower center-wing-region skin is less than 5%, less than 2%, and/or zero.

A1.2. The aircraft of any of paragraphs A1-A1.1.1, wherein the wing assembly further comprises a/the forward-most center wing spar and an/the aft-most center wing spar within the center wing region; and wherein the (first) single skin segment extends forward of the center wing region by a distance that is at least 25%, at least 50%, and/or at least 75% of a/the maximum longitudinal distance between the forward-most center wing spar and the aft-most center wing spar.

A1.3. The aircraft of any of paragraphs A1-A1.2, wherein the wing assembly further comprises a/the forward-most center wing spar and an/the aft-most center wing spar within the center wing region; and wherein the (first) single skin segment has a (second) lateral width at a (second) transition between the center wing region and the fuselage rearward of the center wing region that is at least 20%, at least 25%, at least 30%, and/or at least 35% of a/the maximum longitudinal distance between the forward-most center wing spar and the aft-most center wing spar.

A1.3.1. The aircraft of paragraph A1.3, wherein at any longitudinal cross-section at the (second) transition, a change in radius of curvature between the outer fuselage skin and the lower center-wing-region skin is less than 5%, less than 2%, and/or zero.

A1.4. The aircraft of any of paragraphs A1-A1.3.1, wherein the wing assembly further comprises a/the forward-most center wing spar and an/the aft-most center wing spar within the center wing region; and wherein the (first) single skin segment extends rearward of the center wing region by a distance that is at least 25%, at least 50%, and/or at least 75% of a/the maximum longitudinal distance between the forward-most center wing spar and the aft-most center wing spar.

A2. The aircraft of any of paragraphs A-A1.4, wherein the lower center-wing-region skin is at least partially coextensive with the outer fuselage skin.

A2.1. The aircraft of paragraph A2, wherein the wing assembly further comprises a/the forward-most center wing spar and an/the aft-most center wing spar within the center wing region;

wherein the lower center-wing-region skin is coextensive with the outer fuselage skin forward of the center wing region for a/the (first) lateral width that is at least 20%, at least 25%, at least 30%, and/or at least 35% of a/the maximum longitudinal distance between the forward-most center wing spar and the aft-most center wing spar.

A2.1.1. The aircraft of paragraph A2.1, wherein at any longitudinal cross-section at a/the (first) transition between the center wing region and the fuselage forward of the center wing region, a change in radius of curvature between the outer fuselage skin and the lower center-wing-region skin is less than 5%, less than 2%, and/or zero.

A2.2. The aircraft of any of paragraphs A2-A2.1.1, wherein the wing assembly further comprises a/the forward-most center wing spar and an/the aft-most center wing spar within the center wing region;

wherein the lower center-wing-region skin is coextensive with the outer fuselage skin rearward of the center wing region for a/the (first) lateral width that is at least 20%, at least 25%, at least 30%, and/or at least 35% of a/the maximum longitudinal distance between the forward-most center wing spar and the aft-most center wing spar.

A2.2.1. The aircraft of paragraph A2.2, wherein at any longitudinal cross-section at a/the (second) transition between the center wing region and the fuselage rearward of the center wing region, a change in radius of curvature between the outer fuselage skin and the lower center-wing-region skin is less than 5%, less than 2%, and/or zero.

A3. The aircraft of any of paragraphs A-A2.2.1, wherein the wing-to-fuselage joint includes a (second or the first) single skin segment that at least partially defines both the lower left-wing-region skin and the lower center-wing-region skin; and wherein the wing-to-fuselage joint further includes a (third or the first or the second) single skin segment that at least partially defines both the lower right-wing-region skin and the lower center-wing-region skin.

A4. The aircraft of any of paragraphs A-A3, wherein the lower left-wing-region skin and the lower right-wing-region skin are coextensive with the lower center-wing-region skin.

A5. The aircraft of any of paragraphs A-A4, wherein at any lateral cross-section along a left transition between the lower left-wing-region skin and the lower center-wing-region skin and at any lateral cross-section along a right transition between the lower right-wing-region skin and the lower center-wing-region skin, a change in radius of curvature is less than 5%, less than 2%, and/or zero.

A6. The aircraft of any of paragraphs A-A5, wherein the center wing region further comprises an upper center-wing-region skin;

wherein the wing-to-fuselage joint includes a (fourth) single skin segment that at least partially defines both the upper left-wing-region skin and the upper center-wing-region skin; and wherein the wing-to-fuselage joint further includes a (fifth or the fourth) single skin segment that at least partially defines both the upper right-wing-region skin and the upper center-wing-region skin.

A7. The aircraft of any of paragraphs A-A6, wherein the center wing region further comprises an/the upper center-wing-region skin; and wherein the upper left-wing-region skin, the upper right-wing-region skin, and the upper center-wing-region skin are coextensive with each other.

A8. The aircraft of any of paragraphs A-A7, further comprising:

a wheel well within the fuselage rearward of the center wing region and comprising a wheel-well pressure deck constructed at least partially of an upper wheel-well skin;

wherein the center wing region further comprises an/the upper center-wing-region skin; and wherein the wing-to-fuselage joint includes a (sixth or the fourth or the fifth) single skin segment that at least partially defines both the upper wheel-well skin and the upper center-wing-region skin.

A8.1. The aircraft of paragraph A8, wherein the wheel well further comprises a rear wheel-well bulkhead extending downward from a rearward edge of the wheel-well pressure deck and constructed at least partially of a wheel-well-bulkhead skin; and wherein the wing-to-fuselage joint further includes a (seventh or the sixth or the fifth or the fourth) single skin segment that at least partially defines both the upper wheel-well skin and the wheel-well-bulkhead skin.

A9. The aircraft of any of paragraphs A-A8, further comprising:

a/the wheel well within the fuselage rearward of the center wing region and comprising a/the wheel-well pressure deck constructed at least partially of an/the upper wheel-well skin;

wherein the center wing region further comprises an/the upper center-wing-region skin; and wherein the upper wheel-well skin is coextensive with the upper center-wing-region skin.

A9.1. The aircraft of paragraph A9, wherein the wheel well further comprises a/the rear wheel-well bulkhead extending downward from a/the rearward edge of the wheel-well pressure deck and constructed at least partially of a/the wheel-well-bulkhead skin; and wherein the upper center-wing-region skin is coextensive with the wheel-well-bulkhead skin.

A10. The aircraft of any of paragraphs A8-A9.1, wherein at any longitudinal cross-section along a (third) transition between the upper wheel-well skin and the upper center-wing-region skin, a change in radius of curvature is less than 5%, less than 2%, and/or zero.

A12. The aircraft of any of paragraphs A8-A10, wherein a/the (third) transition between the upper wheel-well skin and the upper center-wing-region skin is planar or concave downward.

A12. The aircraft of any of paragraphs A8-A11, wherein across a full span of the upper wheel-well skin and the upper center-wing-region skin, no region is concave upward.

A13. The aircraft of any of paragraphs A-A12, wherein the wing assembly further comprises a/the forward-most center wing spar and an/the aft-most center wing spar within the center wing region;

wherein the center wing region further comprises an/the upper center-wing-region skin; and wherein a maximum vertical distance between the lower center-wing-region skin and the upper center-wing-region skin is at least 25%, at least 30%, at least 35%, and/or at least 40% of a maximum longitudinal distance between the forward-most center wing spar and the aft-most center wing spar.

A14. The aircraft of any of paragraphs A-A13, wherein the wing assembly further comprises a single forward-most wing spar that spans the left wing region, the center wing region, and the right wing region.

A15. The aircraft of any of paragraphs A-A13, wherein the wing assembly further comprises:

a single left forward-most wing spar that spans the left wing region and a left half of the center wing region; and a single right forward-most wing spar that spans the right wing region and a right half of the center wing region.

A16. The aircraft of any of paragraphs A-A15, further comprising:

a/the wheel well defined within the fuselage aft of the center wing region;

wherein the wing assembly further comprises a keel beam extending from at least partially within the center wing region rearward across the wheel well.

A16.1. The aircraft of paragraph A16, wherein the keel beam further extends forward of the center wing region.

A16.2 The aircraft of paragraph A16 when depending from paragraph A1, wherein the single skin segment at least partially defines both of the lower center-wing-region skin and the keel beam.

A17. The aircraft of any of paragraphs A-A16.2, wherein the outer fuselage skin, the lower left-wing-region skin, the upper left-wing-region skin, the lower right-wing-region skin, the upper right-wing-region skin, the lower center-wing-region skin, and a/the upper center-wing-region skin are constructed of a fiber reinforced composite material.

A18. The use of the aircraft of any of paragraphs A-A17 to transport at least one of people and cargo.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft, comprising:
    a fuselage, wherein the fuselage comprises an outer fuselage skin that at least partially defines an outer surface of the fuselage; and
    a wing assembly operably coupled to the fuselage via a wing-to-fuselage joint, wherein the wing assembly comprises:
        a left wing region comprising a lower left-wing-region skin that at least partially defines a lower left-wing-region airfoil surface and an upper left-wing-region skin that at least partially defines an upper left-wing-region airfoil surface;
        a right wing region comprising a lower right-wing-region skin that at least partially defines a lower right-wing-region airfoil surface and an upper right-wing-region skin that at least partially defines an upper right-wing-region airfoil surface;
        a center wing region between the left wing region and the right wing region and comprising a lower center-wing-region skin; and
        a forward-most center wing spar and an aft-most center wing spar within the center wing region;
    wherein the wing-to-fuselage joint includes a single skin segment that at least partially defines both the outer fuselage skin and the lower center-wing-region skin; and
    wherein the single skin segment has a lateral width at a transition between the center wing region and the fuselage forward of the center wing region that is at least 25% of a maximum longitudinal distance between the forward-most center wing spar and the aft-most center wing spar.

2. The aircraft of claim 1, wherein at any longitudinal cross-section at the transition, a change in radius of curvature between the outer fuselage skin and the lower center-wing-region skin is less than 5%.

3. The aircraft of claim 1, wherein the single skin segment extends forward of the center wing region by a distance that is at least 25% of the maximum longitudinal distance between the forward-most center wing spar and the aft-most center wing spar.

4. The aircraft of claim 1 wherein the outer fuselage skin, the lower left-wing-region skin, the upper left-wing-region skin, the lower right-wing-region skin, the upper right-wing-region skin, and the lower center-wing-region skin are constructed of a fiber reinforced composite material.

5. The aircraft of claim 1, wherein the single skin segment extends forward of the center wing region by a distance that is at least 25% of the maximum longitudinal distance between the forward-most center wing spar and the aft-most center wing spar.

6. The aircraft of claim 1, wherein the single skin segment extends rearward of the center wing region by a distance that is at least 25% of the maximum longitudinal distance between the forward-most center wing spar and the aft-most center wing spar.

7. The aircraft of claim 1, wherein the single skin segment further at least partially defines at least one of the lower left-wing-region skin and the lower right-wing-region skin.

8. The aircraft of claim 2,
    wherein the single skin segment is a first single skin segment;
    wherein the wing-to-fuselage joint includes a second single skin segment that at least partially defines both the lower left-wing-region skin and the lower center-wing-region skin; and
    wherein the wing-to-fuselage joint further includes a third single skin segment that at least partially defines both the lower right-wing-region skin and the lower center-wing-region skin.

9. An aircraft, comprising:
    a fuselage, wherein the fuselage comprises an outer fuselage skin that at least partially defines an outer surface of the fuselage; and
    a wing assembly operably coupled to the fuselage via a wing-to-fuselage joint, wherein the wing assembly comprises:
        a left wing region comprising a lower left-wing-region skin that at least partially defines a lower left-wing-region airfoil surface and an upper left-wing-region skin that at least partially defines an upper left-wing-region airfoil surface;
        a right wing region comprising a lower right-wing-region skin that at least partially defines a lower right-wing-region airfoil surface and an upper right-wing-region skin that at least partially defines an upper right-wing-region airfoil surface;
        a center wing region between the left wing region and the right wing region and comprising a lower center-wing-region skin; and
        a forward-most center wing spar and an aft-most center wing spar within the center wing region;
    wherein the wing-to-fuselage joint includes a single skin segment that at least partially defines both the outer fuselage skin and the lower center-wing-region skin; and
    wherein the single skin segment has a lateral width at a transition between the center wing region and the fuselage rearward of the center wing region that is at least 25% of a maximum longitudinal distance between the forward-most center wing spar and the aft-most center wing spar.

10. The aircraft of claim 9, wherein at any longitudinal cross-section at the transition, a change in radius of curvature between the outer fuselage skin and the lower center-wing-region skin is less than 5%.

11. The aircraft of claim 9, wherein the single skin segment extends forward of the center wing region by a distance that is at least 25% of the maximum longitudinal distance between the forward-most center wing spar and the aft-most center wing spar.

12. The aircraft of claim 9, wherein the single skin segment extends rearward of the center wing region by a distance that is at least 25% of the maximum longitudinal distance between the forward-most center wing spar and the aft-most center wing spar.

13. The aircraft of claim 9, wherein the single skin segment further at least partially defines at least one of the lower left-wing-region skin and lower right-wing-region skin.

14. The aircraft of claim 9,
wherein the single skin segment is a first single skin segment;
wherein the wing-to-fuselage joint includes a second single skin segment that at least partially defines both the lower left-wing-region skin and the lower center-wing-region skin; and
wherein the wing-to-fuselage joint further includes a third single skin segment that at least partially defines both the lower right-wing-region skin and the lower center-wing-region skin.

15. An aircraft, comprising:
a fuselage, wherein the fuselage comprises an outer fuselage skin that at least partially defines an outer surface of the fuselage; and
a wing assembly operably coupled to the fuselage via a wing-to-fuselage joint, wherein the wing assembly comprises:
  a left wing region comprising a lower left-wing-region skin that at least partially defines a lower left-wing-region airfoil surface and an upper left-wing-region skin that at least partially defines an upper left-wing-region airfoil surface;
  a right wing region comprising a lower right-wing-region skin that at least partially defines a lower right-wing-region airfoil surface and an upper right-wing-region skin that at least partially defines an upper right-wing-region airfoil surface; and
  a center wing region between the left wing region and the right wing region and comprising a lower center-wing-region skin and an upper center-wing-region skin;
wherein the wing-to-fuselage joint includes a first single skin segment that at least partially defines both the outer fuselage skin and the lower center-wing-region skin;
wherein the wing-to-fuselage joint includes a second single skin segment that at least partially defines both the upper left-wing-region skin and the upper center-wing-region skin; and
wherein the wing-to-fuselage joint further includes a third single skin segment that at least partially defines both the upper right-wing-region skin and the upper center-wing-region skin.

16. The aircraft of claim 15, wherein the outer fuselage skin, the lower left-wing-region skin, the upper left-wing-region skin, the lower right-wing-region skin, the upper right-wing-region skin, and the lower center-wing-region skin are constructed of a fiber reinforced composite material.

17. An aircraft, comprising:
a fuselage, wherein the fuselage comprises an outer fuselage skin that at least partially defines an outer surface of the fuselage;
a wing assembly operably coupled to the fuselage via a wing-to-fuselage joint, wherein the wing assembly comprises:
  a left wing region comprising a lower left-wing-region skin that at least partially defines a lower left-wing-region airfoil surface and an upper left-wing-region skin that at least partially defines an upper left-wing-region airfoil surface;
  a right wing region comprising a lower right-wing-region skin that at least partially defines a lower right-wing-region airfoil surface and an upper right-wing-region skin that at least partially defines an upper right-wing-region airfoil surface; and
  a center wing region between the left wing region and the right wing region and comprising a lower center-wing-region skin and an upper center-wing-region skin; and
a wheel well within the fuselage rearward of the center wing region and comprising a wheel-well pressure deck constructed at least partially of an upper wheel-well skin;
wherein the wing-to-fuselage joint includes a first single skin segment that at least partially defines both the outer fuselage skin and the lower center-wing-region skin; and
wherein the wing-to-fuselage joint includes a second single skin segment that at least partially defines both the upper wheel-well skin and the upper center-wing-region skin.

18. The aircraft of claim 17, wherein the outer fuselage skin, the lower left-wing-region skin, the upper left-wing-region skin, the lower right-wing-region skin, the upper right-wing-region skin, and the lower center-wing-region skin are constructed of a fiber reinforced composite material.

19. The aircraft of claim 17,
wherein the wheel well further comprises a rear wheel-well bulkhead extending downward from a rearward edge of the wheel-well pressure deck and constructed at least partially of a wheel-well-bulkhead skin; and
wherein the wing-to-fuselage joint further includes a third single skin segment that at least partially defines both the upper center-wing-region skin and the wheel-well-bulkhead skin.

20. An aircraft, comprising:
a fuselage; and
a wing assembly operably coupled to the fuselage, wherein the wing assembly comprises:
  a left wing region;
  a right wing region;
  a center wing region between the left wing region and the right wing region and comprising a lower center-wing-region skin and an upper center-wing-region skin; and
  a forward-most center wing spar and an aft-most center wing spar within the center wing region;
wherein a maximum vertical distance between the lower center-wing-region skin and the upper center-wing-region skin is at least 25% of a maximum longitudinal distance between the forward-most center wing spar and the aft-most center wing spar.

21. An aircraft, comprising:
a fuselage; and
a wing assembly operably coupled to the fuselage, wherein the wing assembly comprises:
  a left wing region;
  a right wing region;
  a center wing region between the left wing region and the right wing region; and
  a single forward-most wing spar that spans the left wing region, the center wing region, and the right wing region.

22. An aircraft, comprising:
a fuselage; and
a wing assembly operably coupled to the fuselage, wherein the wing assembly comprises:
  a left wing region;
  a right wing region;
  a center wing region between the left wing region and the right wing region;

a single left forward-most wing spar that spans the left wing region and a left half of the center wing region; and a single right forward-most wing spar that spans the right wing region and a right half of the center wing region.

23. An aircraft, comprising:

a fuselage, wherein the fuselage comprises an outer fuselage skin that at least partially defines an outer surface of the fuselage;

a wing assembly operably coupled to the fuselage via a wing-to-fuselage joint, wherein the wing assembly comprises:

a left wing region comprising a lower left-wing-region skin that at least partially defines a lower left-wing-region airfoil surface and an upper left-wing-region skin that at least partially defines an upper left-wing-region airfoil surface;

a right wing region comprising a lower right-wing-region skin that at least partially defines a lower right-wing-region airfoil surface and an upper right-wing-region skin that at least partially defines an upper right-wing-region airfoil surface; and a center wing region between the left wing region and the right wing region and comprising a lower center-wing-region skin; and a wheel well defined within the fuselage aft of the center wing region;

wherein the wing assembly further comprises a keel beam extending from at least partially within the center wing region rearward across the wheel well;

wherein the wing-to-fuselage joint includes a single skin segment that at least partially defines both the outer fuselage skin and the lower center-wing-region skin; and wherein the single skin segment at least partially defines both of the lower center-wing-region skin and the keel beam.

24. An aircraft, comprising:

a fuselage, wherein the fuselage comprises an outer fuselage skin that at least partially defines an outer surface of the fuselage; and a wing assembly operably coupled to the fuselage via a wing-to-fuselage joint, wherein the wing assembly comprises:

a left wing region comprising a lower left-wing-region skin that at least partially defines a lower left-wing-region airfoil surface and an upper left-wing-region skin that at least partially defines an upper left-wing-region airfoil surface;

a right wing region comprising a lower right-wing-region skin that at least partially defines a lower right-wing-region airfoil surface and an upper right-wing-region skin that at least partially defines an upper right-wing-region airfoil surface; and a center wing region between the left wing region and the right wing region and comprising a lower center-wing-region skin;

wherein the lower left-wing-region skin and the lower right-wing-region skin are coextensive with the lower center-wing-region skin; and wherein at any lateral cross-section along a left transition between the lower left-wing-region skin and the lower center-wing-region skin and at any lateral cross-section along a right transition between the lower right-wing-region skin and the lower center-wing-region skin, a change in radius of curvature is less than 5%.

25. The aircraft of claim 24, wherein the wing assembly further comprises a forward-most center wing spar and an aft-most center wing spar within the center wing region;

wherein the center wing region further comprises an upper center-wing-region skin; and wherein a maximum vertical distance between the lower center-wing-region skin and the upper center-wing-region skin is at least 25% of a maximum longitudinal distance between the forward-most center wing spar and the aft-most center wing spar.

26. An aircraft, comprising:

a fuselage, wherein the fuselage comprises an outer fuselage skin that at least partially defines an outer surface of the fuselage; and a wing assembly operably coupled to the fuselage via a wing-to-fuselage joint, wherein the wing assembly comprises:

a left wing region comprising a lower left-wing-region skin that at least partially defines a lower left-wing-region airfoil surface and an upper left-wing-region skin that at least partially defines an upper left-wing-region airfoil surface;

a right wing region comprising a lower right-wing-region skin that at least partially defines a lower right-wing-region airfoil surface and an upper right-wing-region skin that at least partially defines an upper right-wing-region airfoil surface;

a center wing region between the left wing region and the right wing region and comprising a lower center-wing-region skin; and a single forward-most wing spar that spans the left wing region, the center wing region, and the right wing region.

* * * * *

UNITED STATES PATENT AND TRADEMARK OFFICE
CERTIFICATE OF CORRECTION

PATENT NO. : 10,766,598 B2
APPLICATION NO. : 15/623256
DATED : September 8, 2020
INVENTOR(S) : Kenneth H. Griess and Gary E. Georgeson Page 1 of 1

It is certified that error appears in the above-identified patent and that said Letters Patent is hereby corrected as shown below:

In the Claims

Claim 8, Column 16, Line 7, remove "claim 2" and insert --claim 1--

Signed and Sealed this
Eighth Day of December, 2020

Andrei Iancu
*Director of the United States Patent and Trademark Office*